W. S. Habberton,
Horse-Collar Machine,
N° 26,671.
Patented Jan. 3, 1860.
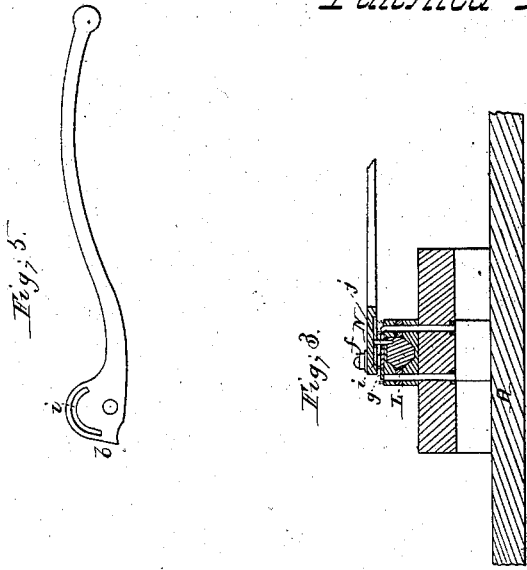
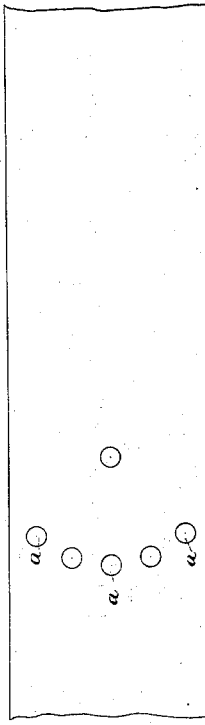
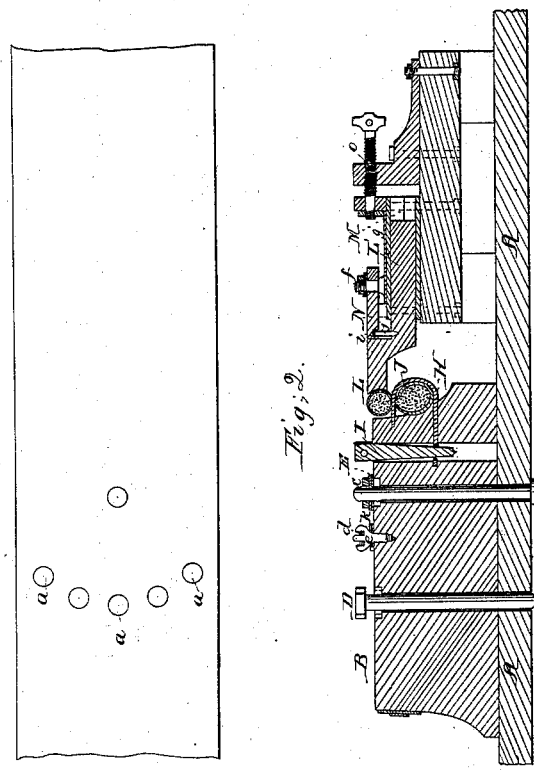
Witnesses;
B. W. Fenwick
Goodwin Y. Abbee
Inventor;
William S. Habberton

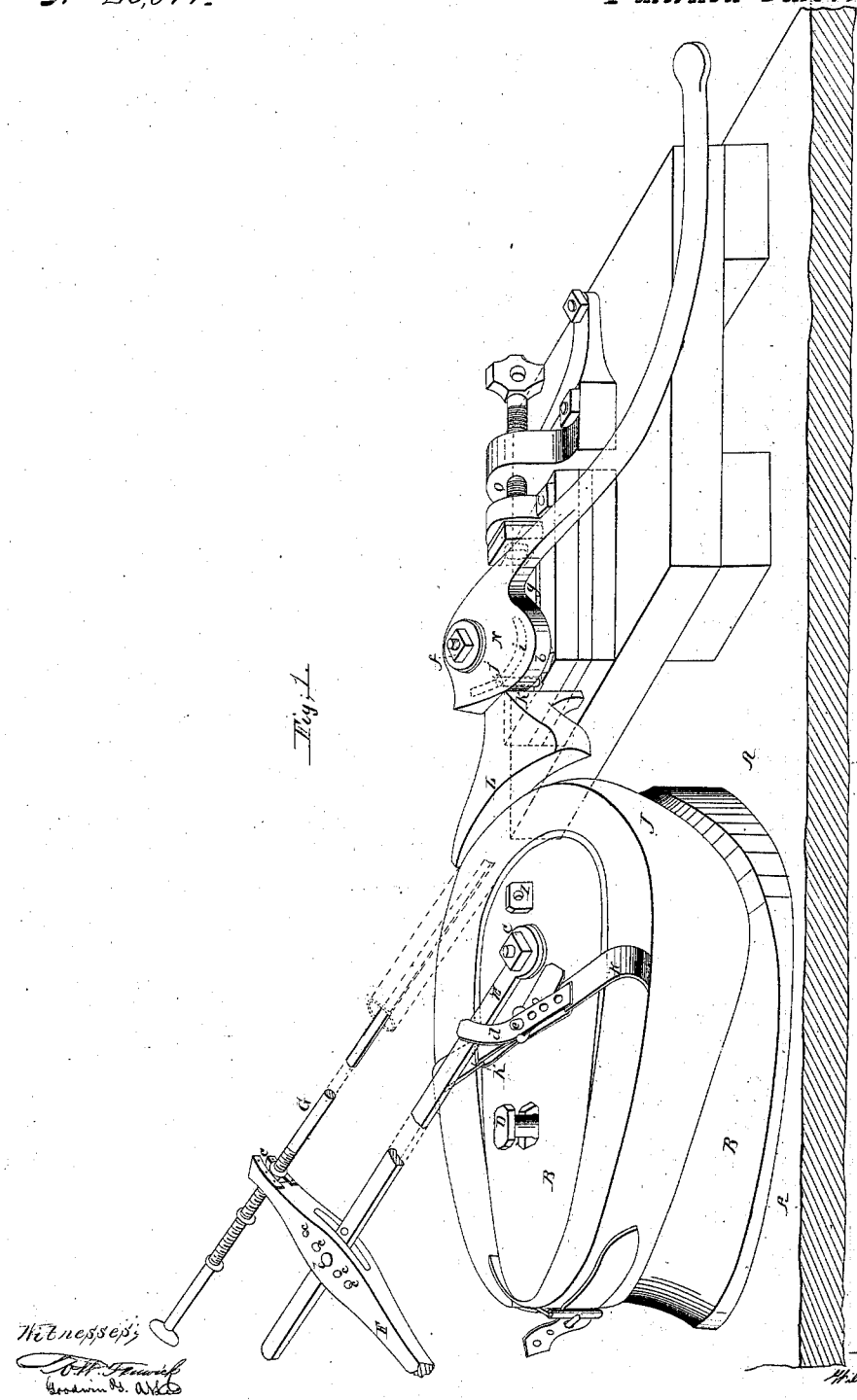

UNITED STATES PATENT OFFICE.

WILLIAM S. HABBERTON, OF MOUNT CARMEL, ILLINOIS.

APPARATUS FOR STUFFING HORSE-COLLARS.

Specification of Letters Patent No. 26,671, dated January 3, 1860.

*To all whom it may concern:*

Be it known that I, WILLIAM S. HABBERTON, of Mount Carmel, in the county of Wabash and State of Illinois, have invented a new and useful Improvement in Machinery for Stuffing and Shaping Horse-Collars; and I do hereby declare that the following is a full, clear, and exact description of the same, reference being had to the accompanying drawings, forming a part of this specification, in which—

Figure 1, is a perspective view of my arrangement of mechanism as applied for stuffing a horse collar. Fig. 2, is a vertical longitudinal section of the same. Fig. 3, is a vertical transverse section of the same. Fig. 4, is a plan of the work bench. Fig. 5, is an inverted view of the lever by which the power is applied to the shaping device.

Similar letters of reference, in each of the several figures indicate corresponding parts.

In the manufacture of horse collars by hand, great labor has to be expended by the operator in shaping the circular bottom part of the collar, and so very difficult is this to be accomplished while the stuffing is placed compactly into the same, the power of the strongest operator, with the front part of the collar placed against his knee, is hardly sufficient to do it perfectly and consequently the back, hands and knee are much fatigued and in a short period the business has to be abandoned by many. Much labor has also to be expended in stuffing the collar by hand after the ordinary methods.

My invention is designed to save the operator much of this labor and at the same time facilitate the manufacture and improve the style and character of horse collars.

My first improvement consists in the use of a clasp and taper pin in combination with the collar block for the purpose of holding the collar on the block while the lower curved or throat portion is being stuffed.

My second improvement consists in the combination of a lever arrangement with the stuffing rod provided with one or more stops and the collar block in the manner hereinbefore described, whereby the operator is enabled to bring to his aid a long leverage in the operation of stuffing the collar.

My third improvement consists in the use in combination with a pivoted adjustable collar block and a stuffing device of an adjustable bending and shaping machine which is constructed substantially in the manner hereinafter described, whereby the throat of the collar can be gradually bent, shaped and stuffed to the proper curved form with very little manual labor.

To enable others, skilled in the art, to make and use my invention, I will proceed to describe its construction and operation.

A, represents a stationary work-bench on which the whole apparatus is mounted.

B, is an ordinary collar block. It is pivoted to the bench by a pivot bolt C, and is furnished with an adjusting set-bolt D, which fits into either of the series of holes $a$, in the top of the bench accordingly as the collar block is turned on its axis.

E, is a lever supporting-arm fitted loosely to the pivot bolt C.

F, is a lever pivoted near the outer end of supporting arm as shown at $b$, or at any point desired, a series of pivot holes being provided in the arm to allow of the lever being set farther from or nearer to the block, as occasion may require. To one end of this lever, a stuffing rod G, is connected, a slot $c$, being cut in the end of the lever to admit the rod and a series of adjustable stops or shoulders arranged to retain the lever in place in the rod, said shoulders being screw tapped so as to fit a screw thread cut on the stuffing rod. By having the shoulders thus arranged, the lever may be shifted from one to the other as the stuffing progresses, or it may be moved out farther from the block by turning the shoulders in a proper direction on the stuffing rod. The lever also has a series of adjusting holes $e$, provided in it so that its length from the fulcrum to the stuffing rod may be increased or decreased, as may be required.

H, is the clasp which holds the throat portion of the collar of the block; this clasp is of hook form and passes through the collar into the back of the collar block. I, is a wedge pin which passes down into an opening cut through the collar block and enters a hole formed in the longest part of the clasp. This pin by being wedge shape draws the clasp tightly around the body J, of the collar, and causes it to fit snugly to the hollow of the collar block.

K, K, are the side clasps for holding the sides of the collar snugly to the hollow of the block; these clasps are also of hook form corresponding in shape to the rim of the collar. These clasps are connected at the center of the block by means of a strap $d$, which has adjusting holes and is confined at its meeting ends by a set screw $e$, of the collar block.

L, represents a sliding concave, it is fitted loosely by means of an extension L', within a metallic guide box M, which is firmly attached to the bench. This concave is of a shape corresponding to that which it is desired to give the throat portion of the collar.

N, is a lever attached by means of a pivot bolt $f$, to a slide $g$, which is fitted by means of dove-tails to the top of the stationary guide box M. The lever has an eccentric or cam $h$, formed on it near its fulcrum. On the underside of the cam or eccentric, an eccentric groove $i$, is cut. Into this groove, a pin $j$, projecting up from the extension of the concave fits and plays freely as the lever is turned on its fulcrum. This pin connects together the lever N, and concave so that after the concave has been forced up against the rim of the collar it shall be drawn back with the return movement of the lever. The eccentric or cam portion of the lever comes in contact with a shoulder $k$, of the concave and causes it to move forward up against the collar rim, with a pressure sufficiently great to cause the throat portion of the collar although compactly stuffed to take the curved form of the concave, both in the path of a vertical circle and in the path of a horizontal circle, and thus the channel between the body and rim of the collar and the proper curved form to fit the throat of the horse formed in the most perfect manner.

O, is an adjusting screw for moving the slide and concave back and forward so as to operate upon different sized collars. It will be observed that although the slide does not move when the lever operates the concave, the concave necessarily moves when the screw operates the slide. This results from the lever having its fulcrum in the slide and being combined with the slide by means of the pin $j$, as represented.

The operation is as follows: The unstuffed collar being placed in the hollow of the block and confined at the throat portion by means of the clasp and wedge pin, the operator lays hold of one end of the collar and commences to insert the stuffing, and as fast as it is introduced applies power to the lever and thus causes the stuffing rod to force the same compactly into the throat portion of the collar. At intervals, he applies power to the lever N, and thereby forces the concave up against the throat portion of the collar thus, and causes it to take a curved form horizontally and vertically. After one portion of the throat of the collar is thus bent and shaped another quantity of stuffing is inserted and rammed down and then the block is turned on its pivot bolt a certain distance and secured by the set bolt. The lever N, is now again brought into action and another portion of the throat of the collar bent and shaped. Thus the operation proceeds gradually until one-half of the throat portion is furnished. The operator now brings the block back to its original position, detaches the stuffing lever, turns it over, and again replaces it so that it stands on the opposite side of the block. He now proceeds to stuff, bend and shape as above described until the other half of the neck portion is completed. This being done and the block again brought to its original position, the sides of the collar are stuffed and when pretty well filled for a certain distance are clasped down by the side clasps. The stuffing now is carried on until completed by using the stuffing rod in the hand without the aid of the lever. The rim being finished, the body is stuffed on the block instead of on the knee by the ordinary hand stuffing rods.

What I claim as my invention and desire to secure by Letters Patent, is—

1. The clasp and taper pin in combination with the collar block substantially as and for the purposes set forth.

2. The combination of the adjustable lever arrangement with the stuffing rod and collar block, substantially as and for the purposes set forth.

3. The use in combination with a collar block and stuffing rod, of an adjustable, bending and shaping machine, constructed and operating substantially as described, in the manner and for the purpose set forth.

WILLIAM S. HABBERTON.

Witnesses:
MICHAEL J. HABBERTON,
JEDH. GITTINGS.